United States Patent
Galpin et al.

(10) Patent No.: US 10,659,785 B2
(45) Date of Patent: May 19, 2020

(54) APPARATUS, SYSTEM AND METHOD OF VIDEO COMPRESSION USING SMART CODING TREE UNIT SCANNING AND CORRESPONDING COMPUTER PROGRAM AND MEDIUM

(71) Applicant: THOMSON Licensing, Issy-les-Moulineaux (FR)

(72) Inventors: Franck Galpin, Thorigne-Fouillard (FR); Fabien Racape, Rennes (FR); Tangi Poirier, Rennes (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 51 days.

(21) Appl. No.: 16/064,484

(22) PCT Filed: Dec. 16, 2016

(86) PCT No.: PCT/EP2016/081611
§ 371 (c)(1),
(2) Date: Jun. 21, 2018

(87) PCT Pub. No.: WO2017/108638
PCT Pub. Date: Jun. 29, 2017

(65) Prior Publication Data
US 2019/0007686 A1 Jan. 3, 2019

(30) Foreign Application Priority Data

Dec. 21, 2015 (EP) ..................... 15307078

(51) Int. Cl.
*H04N 19/129* (2014.01)
*H04N 19/174* (2014.01)
(Continued)

(52) U.S. Cl.
CPC ......... *H04N 19/129* (2014.11); *H04N 19/105* (2014.11); *H04N 19/119* (2014.11);
(Continued)

(58) Field of Classification Search
CPC .... H04N 19/129; H04N 19/66; H04N 19/119; H04N 19/174; H04N 19/17;
(Continued)

(56) References Cited

U.S. PATENT DOCUMENTS

| | | |
|---|---|---|
| 6,476,934 B1 | 11/2002 | Ilbery et al. |
| 8,693,740 B1 | 4/2014 | Sridhara et al. |

(Continued)

FOREIGN PATENT DOCUMENTS

| | | |
|---|---|---|
| CN | 101155302 | 3/2012 |
| EP | 2211552 | 7/2010 |

(Continued)

*Primary Examiner* — Allen C Wong
(74) *Attorney, Agent, or Firm* — Brian J. Dorini, Esquire; Robert D. Shedd, Esquire (57) ABSTRACT

It is provided an apparatus for encoding an image frame, wherein the image frame being partitioned into non-overlapping units (1002, 1008), the partitioned units being included in a first region, a second region and a third region of the image frame (1008, 1012), each of the first region, the second region and the third region being associated with an indicator indicating a raster scanning order; comprising means for encoding the third region of the image frame, based on the indicator of the third region, starting at a first unit from the right and the top in the third region using a raster scan technique (1002, 1008, 1012, 1016); means for encoding the second region of the image frame, based on the indicator of the second region, starting at a first unit from the right in the second region (1002, 1008, 1012, 016); and means for encoding the first region, based on the indicator (Continued)

of the first region, starting at a first unit from the top or the bottom in the first region (1002, 1008, 1012, 1016).

20 Claims, 10 Drawing Sheets

(51) Int. Cl.
    *H04N 19/17*     (2014.01)
    *H04N 19/176*     (2014.01)
    *H04N 19/105*     (2014.01)
    *H04N 19/46*     (2014.01)
    *H04N 19/593*     (2014.01)
    *H04N 19/119*     (2014.01)
    *H04N 19/66*     (2014.01)

(52) U.S. Cl.
    CPC ........... *H04N 19/17* (2014.11); *H04N 19/174* (2014.11); *H04N 19/176* (2014.11); *H04N 19/46* (2014.11); *H04N 19/593* (2014.11); *H04N 19/66* (2014.11)

(58) Field of Classification Search
    CPC .... H04N 19/593; H04N 19/46; H04N 19/176; H04N 19/105
    USPC ..................................................... 375/240.24
    See application file for complete search history.

(56) References Cited

U.S. PATENT DOCUMENTS

| | | | |
|---|---|---|---|
| 2004/0076237 A1* | 4/2004 | Kadono | H04N 19/105 375/240.29 |
| 2015/0146794 A1 | 5/2015 | Hoang | |
| 2016/0057438 A1* | 2/2016 | Yamamoto | H04N 19/30 382/233 |

FOREIGN PATENT DOCUMENTS

| | | |
|---|---|---|
| WO | WO2008024345 | 2/2008 |
| WO | WO2015038928 | 3/2015 |

\* cited by examiner

APPARATUS, SYSTEM AND METHOD OF VIDEO COMPRESSION USING SMART CODING TREE UNIT SCANNING AND CORRESPONDING COMPUTER PROGRAM AND MEDIUM

This application claims the benefit of International Application PCT/EP2016/081611, under 35 U.S.C. § 365, filed on Dec. 16, 2016, which was published in accordance with Article 21(2) on Jun. 29, 2017, in English, and claims priority to European Patent Application No. 15307078.4 filed Dec. 21, 2015.

TECHNICAL DOMAIN

The present principles relate to an apparatus and a method for video compression, and more particularly, to an apparatus and a method of video compression utilizing smart scanning of an image.

BACKGROUND

To improve the quality of videos, more and more detail (i.e., higher resolution) is captured during the recording processes. This leads to larger amounts of data required to reproduce the video. In order to bring the data to a manageable level, various types of compression methods are used to reduce the quantity of data. One method of doing this requires that an image or frame is divided into smaller parts or sections. If, for example, two sequential sections remain the same color, the color information can be coded once for both sections and includes information that tells which two sections on which to apply the color. Likewise, it is possible that if all surrounding sections to another section are the same color, it might be reasonable to predict that the another adjacent section is also the same color. This method can work well when there are several surrounding sections from which to obtain information from for a prediction. However, when a section is at the beginning or even a side section of an image or frame, there are less sections surrounding the section from which to gain insightful information from which to make a prediction.

SUMMARY

To improve video compression coding that relies on coding tree units (CTU), a coding scan order of the CTU is re-ordered to increase the coding efficiency. The re-ordering allows additional predictive information to be obtained for blocks or units of an image that would not have the information available in a traditional scan order. Thus, the coding efficiency of the CTU is increased by improving the number of CTU coded with prediction information versus the number of CTU coded without prediction information.

One embodiment includes an apparatus for encoding an image frame, wherein the image frame being partitioned into non-overlapping units (1002, 1008), the partitioned units being included in a first region, a second region and a third region of the image frame (1008, 1012), each of the first region, the second region and the third region being associated with an indicator indicating a raster scanning order; comprising means for encoding the third region of the image frame, based on the indicator of the third region, starting at a first unit from the right and the top in the third region using a raster scan technique (1002, 1008, 1012, 1016); means for encoding the second region of the image frame, based on the indicator of the second region, starting at a first unit from the right in the second region (1002, 1008, 1012, 1016); and means for encoding the first region, based on the indicator of the first region, starting at a first unit from the top or the bottom in the first region (1002, 1008, 1012, 1016).

In another embodiment, a method for encoding an image is provided, wherein the image frame being partitioned into non-overlapping units (1002, 1008), the partitioned units being included in a first region, a second region and a third region of the image frame (1008, 1012), each of the first region, the second region and the third region being associated with an indicator indicating a raster scanning order; comprising encoding the third region of the image frame, based on the indicator of the third region, starting at a first unit from the right and the top in the third region using a raster scan technique (1002, 1008, 1012, 1016); encoding the second region of the image frame, based on the indicator of the second region, starting at a first unit from the right in the second region (1002, 1008, 1012, 1016); and encoding the first region, based on the indicator of the first region, starting at a first unit from the top or the bottom in the first region (1002, 1008, 1012, 1016).

In an embodiment, an apparatus for decoding an image is provided, wherein the image frame being partitioned into non-overlapping units (1002, 1008), the partitioned units being included in a first region, a second region and a third region of the image frame (1008, 1012), each of the first region, the second region and the third region being associated with an indicator indicating a raster scanning order; it comprises means for decoding the third region of the image frame, based on the indicator of the third region, starting at a first unit from the right and the top in the third region using a raster scan technique (1002, 1008, 1012, 1016); means for decoding the second region of the image frame, based on the indicator of the second region, starting at a first unit from the right in the second region (1002, 1008, 1012, 1016); and means for decoding the first region, based on the indicator of the first region, starting at a first unit from the top or the bottom in the first region (1002, 1008, 1012, 1016).

Another embodiment can include a method for decoding an image, wherein the image frame being partitioned into non-overlapping units (1002, 1008), the partitioned units being included in a first region, a second region and a third region of the image frame (1008, 1012), each of the first region, the second region and the third region being associated with an indicator indicating a raster scanning order; comprising decoding the third region of the image frame, based on the indicator of the third region, starting at a first unit from the right and the top in the third region using a raster scan technique (1002, 1008, 1012, 1016); decoding the second region of the image frame, based on the indicator of the second region, starting at a first unit from the right in the second region (1002, 1008, 1012, 1016); and decoding the first region, based on the indicator of the first region, starting at a first unit from the top or the bottom in the first region (1002, 1008, 1012, 1016).

Another embodiment includes a system comprising a memory for storing image information and at least one processor configured to: receive a frame of an image partitioned into non-overlapping units to create coding tree units CTU, group the partitioned units into at least two regions and embed or read at least one bit in each of the at least two regions to indicate a raster scanning order. In an alternative embodiment, the system can comprise the at least one processor being further configured to: encode the image frame, based on the scanning order bit of a first region, starting at a second CTU in both vertical and horizontal directions of the image frame using a raster scan technique;

rotate the image frame 180 degrees; and encode or decode, based on the scanning order bit of a second region, starting at a first CTU in both vertical and horizontal direction of the second region of the rotated frame to a last CTU in both vertical and horizontal direction of the second region of the rotated image frame. In another alternative embodiment, the system can comprise the at least one processor being further configured to: encode or decode, based on the scanning order bit of a third region, starting at a last CTU in a horizontal direction being a first CTU in a vertical direction of the third region of the rotated image frame to a last CTU in a horizontal direction being a last CTU in a vertical direction of the third region of the rotated image frame.

Other embodiments include a non-transitory computer readable program product, characterized in that it comprises program code instructions for performing the aforementioned methods and their alternative embodiments, when said non-transitory software program is executed by a computer. A further embodiment includes a computer readable storage medium carrying a software program characterized in that it comprises program code instructions for performing the aforementioned methods and their alternative embodiments, when said non-transitory software program is executed by a computer.

The above presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

To the accomplishment of the foregoing and related ends, certain illustrative aspects of embodiments are described herein in connection with the following description and the annexed drawings. These aspects are indicative, however, of but a few of the various ways in which the principles of the subject matter can be employed, and the subject matter is intended to include all such aspects and their equivalents. Other advantages and novel features of the subject matter can become apparent from the following detailed description when considered in conjunction with the drawings.

DETAILED DESCRIPTION

The subject matter is now described with reference to the drawings, wherein like reference numerals are used to refer to like elements throughout. In the following description, for purposes of explanation, numerous specific details are set forth in order to provide a thorough understanding of the subject matter. It can be evident, however, that subject matter embodiments can be practiced without these specific details. In other instances, well-known structures and devices are shown in block diagram form in order to facilitate describing the embodiments.

In one type of video compression, an image is partitioned into non-overlapping blocks or units (e.g., Coding Tree Units, CTU in the High Efficiency Video Coding (HEVC) standard). Each CTU can then be divided into Coding Units (CU) so that each of them corresponds to a unit of coding for prediction, reconstruction, or transformation. The default order for scanning CTUs is the raster scan where it starts at the top left 104 of a frame 102 and finishes at the bottom right 106 as in an example 100 depicted in FIG. 1. For efficiency of compression purposes, each CTU 108 can be spatially predicted from its previously encoded/decoded neighbors (typically above 110, above-left 112 and left 114 CTUs in raster scan). For example, in Intra mode, the first Prediction Unit (PU) inside a CTU will use neighboring top or left pixels coming from the CTU above or on the left. In Inter mode, surrounding motion vectors can also be used as predictors for coding the current motion vector.

Figure 1:
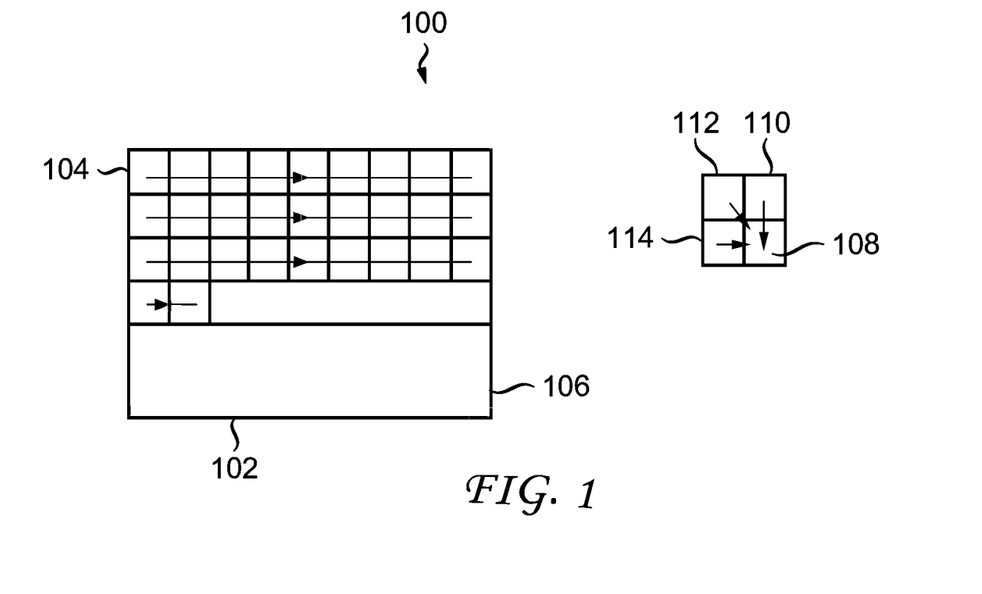
FIG. 1 depicts an exemplary scanning order of Coding Tree Units of a video image frame and an example of prediction using surrounding blocks in accordance with an embodiment of the present principles.

In a 'reverse raster scan,' not shown in FIG. 1, (i.e., a raster scan oriented in the opposite direction of a raster scan), each CTU can be spatially predicted from its previously encoded/decoded neighbors (typically above, above right and right). If a reverse order raster scan were performed on frame 102, it would start at the upper-most, right block and continue to the lower most left block. Reversing the direction of the scan order can help to predict CTUs that might not have predictors in the normal or standard scan direction.

Figure 2A:
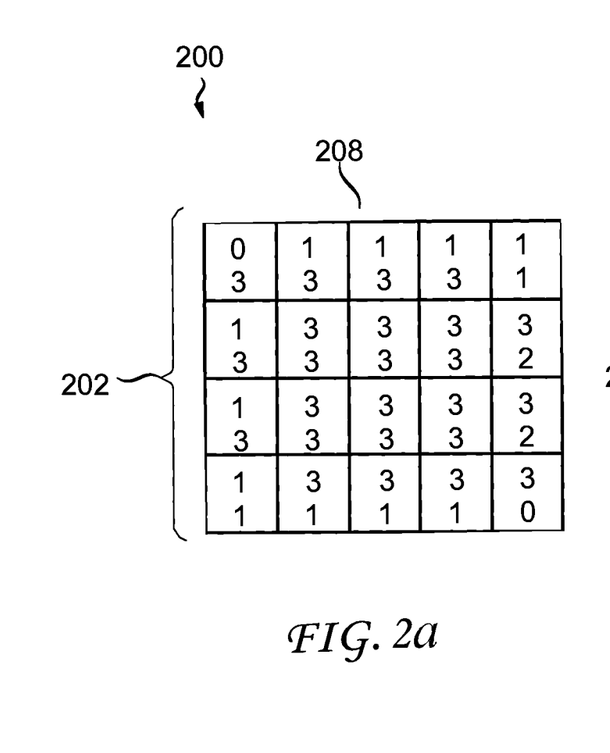
FIGS. 2a and 2b illustrate exemplary prediction results of techniques used with the present principles compared to a standard raster scan in accordance with an embodiment of the present principles.
Figure 2B:
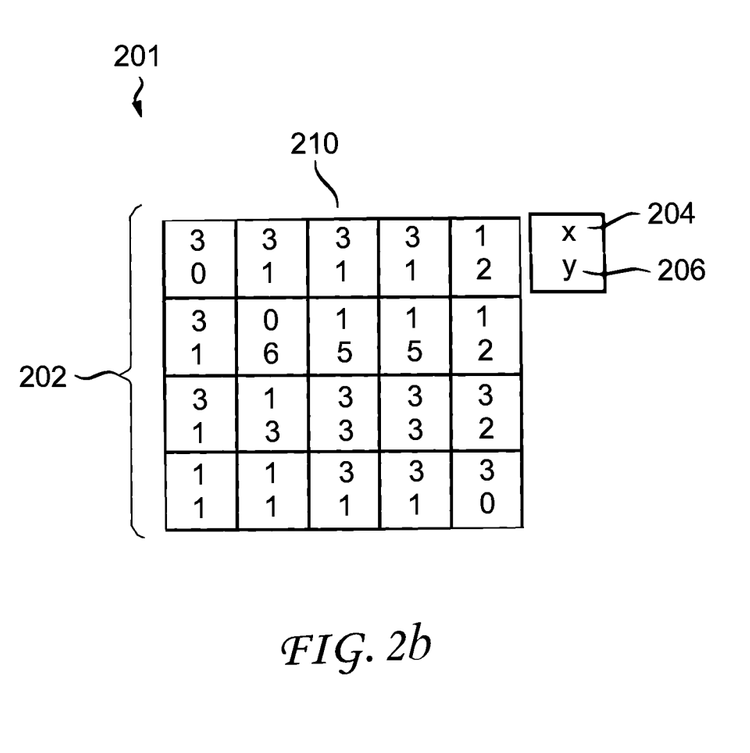

In a standard raster scan, for the first CTU to be encoded (top-left of the frame), no spatial predictor is available since this is the first encoded CTU. Furthermore, for the first line of CTUs, no top spatial predictor is available since this is the first line of the frame in raster scan order. In this case, the coding cost of such CTU can be considerably higher. However, the first encoded CTU will only be used for the spatial prediction of its right, bottom and bottom right neighbors. In the same way, the first line of CTUs does not take advantage of any prediction from CTUs above. With a scanning technique utilizing an embodiment of the present principles, better use of the over cost of the first coded CTUs allows an improvement in the coding efficiency of a whole frame. Furthermore, no additional syntax is required for these techniques if they are adopted as the standard way to encode frames. For a given block 202, FIG. 2a illustrates an example 200 that shows a number of predictors 204 used and a number of predictions 206 which can be used from a given block 202 with a standard raster scan method 208. FIG. 2b illustrates an example 201 that shows a number of predictors 204 used and a number of predictions 206 which can be used from the same given block 202 with scanning technique 210 utilizing an embodiment of the present principles. Embodiments of the scanning technique 210 are discussed below.

Figure 3:
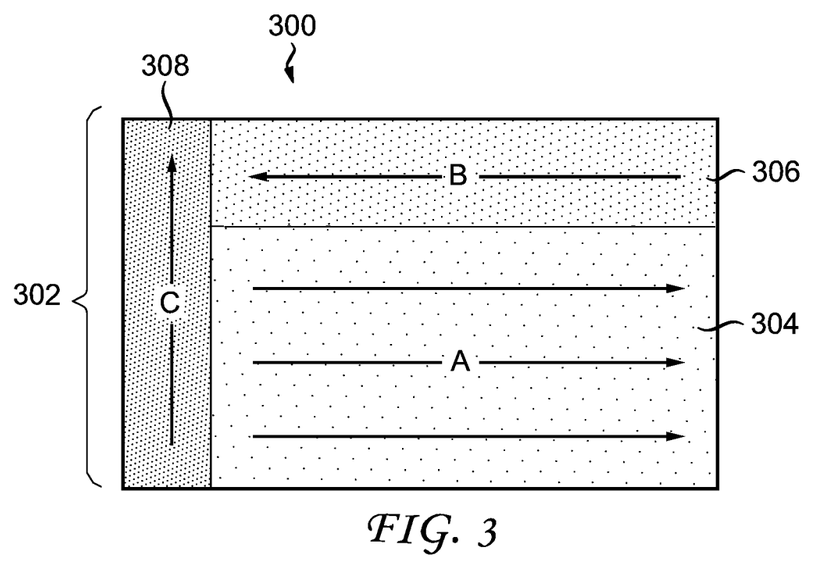
FIG. 3 shows an exemplary CTU scanning order in accordance with an embodiment of the present principles.

In FIG. 3, an exemplary CTU scanning order 300 in accordance with an embodiment of the present principles is illustrated. An image or frame 302 is divided into three different areas (or regions or slices). First, an area A 304 of the frame 302 is encoded/decoded in raster scan order. Then an area B 306 of the frame 302, which is only one CTU in height, is encoded/decoded in reverse raster scan order. Finally, an area C 308 of the frame 302, which is only one CTU in width, is encoded/decoded in reverse raster scan order. In an embodiment of the present principles scan order, a simple flag signaling a "Smart CTU Scan order" can be encoded/decoded for each slice/area/region. This encoding/decoding order is fixed inside a region and does not need to be encoded/decoded inside a bitstream. Obviously, if the region A is less or equal to two CTU in height, the area B 306 is removed and if the region A is less or equal to two CTU in width, the area C 308 is removed. One should also note that in the presented example, coding reordering is performed for a slice beginning at the first column of the frame.

Figure 4:
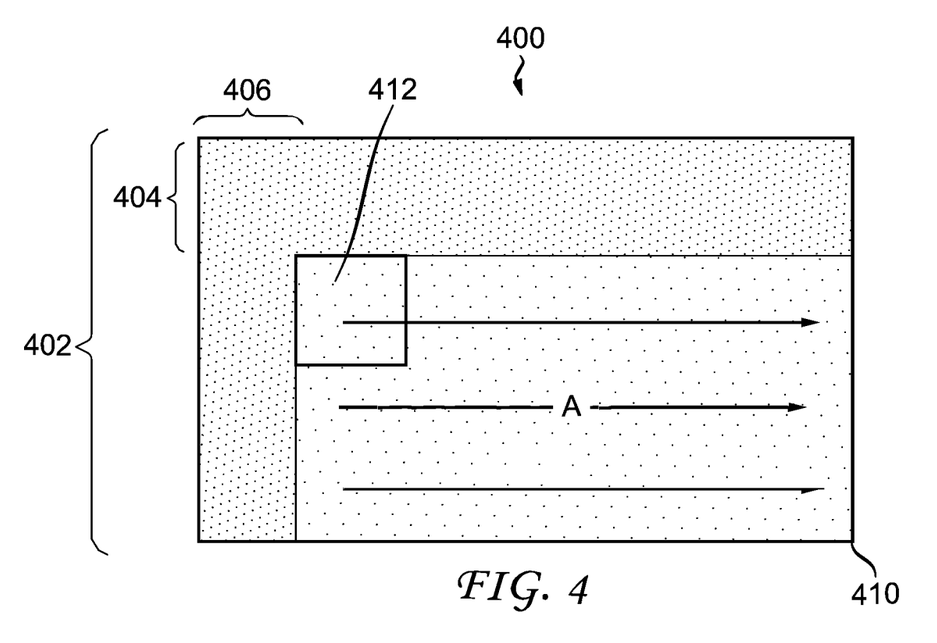
FIG. 4 shows another exemplary CTU scanning order in accordance with an embodiment of the present principles.

FIG. 4 shows an example 400 of a CTU scanning technique according to an embodiment of the present principles to encode/decode an image/frame 402. Step 1: Area A—an area A corresponds to a slice/region starting at a $2^{nd}$ CTU from the top (just below a horizontal top slice 404 that is one CTU in height) and a $2^{nd}$ CTU from a side (just beside a vertical slice 406 that is one CTU wide) up to the end of the slice/region 410. It is typically coded in raster scan order as shown in FIG. 4 or FIG. 2a. The top-left CTU 412 of area A does not use any spatial prediction since no blocks are available. One should notice that the first line of encoded CTUs inside the area A is used for predicting a second line of the area.

Figure 5:
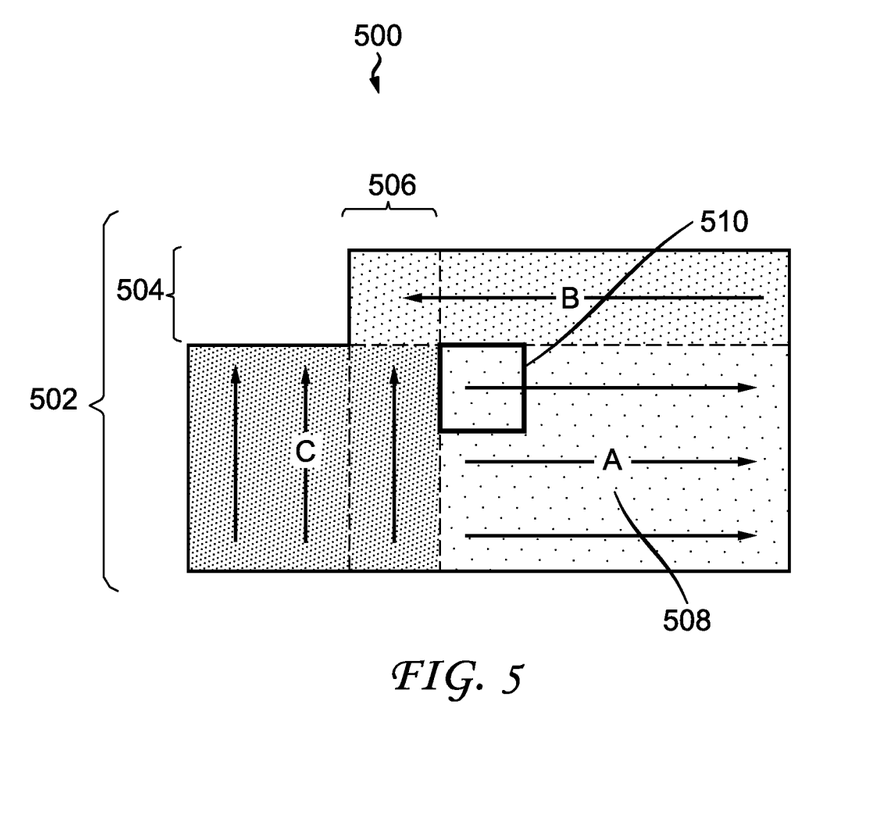
FIG. 5 illustrates an exemplary CTU scanning technique for an arbitrary slice/region of a frame in accordance with an embodiment of the present principles.

FIG. 5 illustrates an example 500 of a CTU scanning technique for an arbitrary slice/region of a frame 502. For slices beginning at arbitrary horizontal positions, the shape of areas A, B and C are adapted accordingly as well as the processing. For any arbitrary slice/region, the processing based on the present principles begins at a starting point that corresponds to a CTU 510 below a CTU slice in the horizontal direction 504 and next to a CTU slice in a vertical direction 506. In other words, it starts at the $2^{nd}$ CTU in both horizontal and vertical directions, using the first CTU as the coordinate origin.

Figure 6:
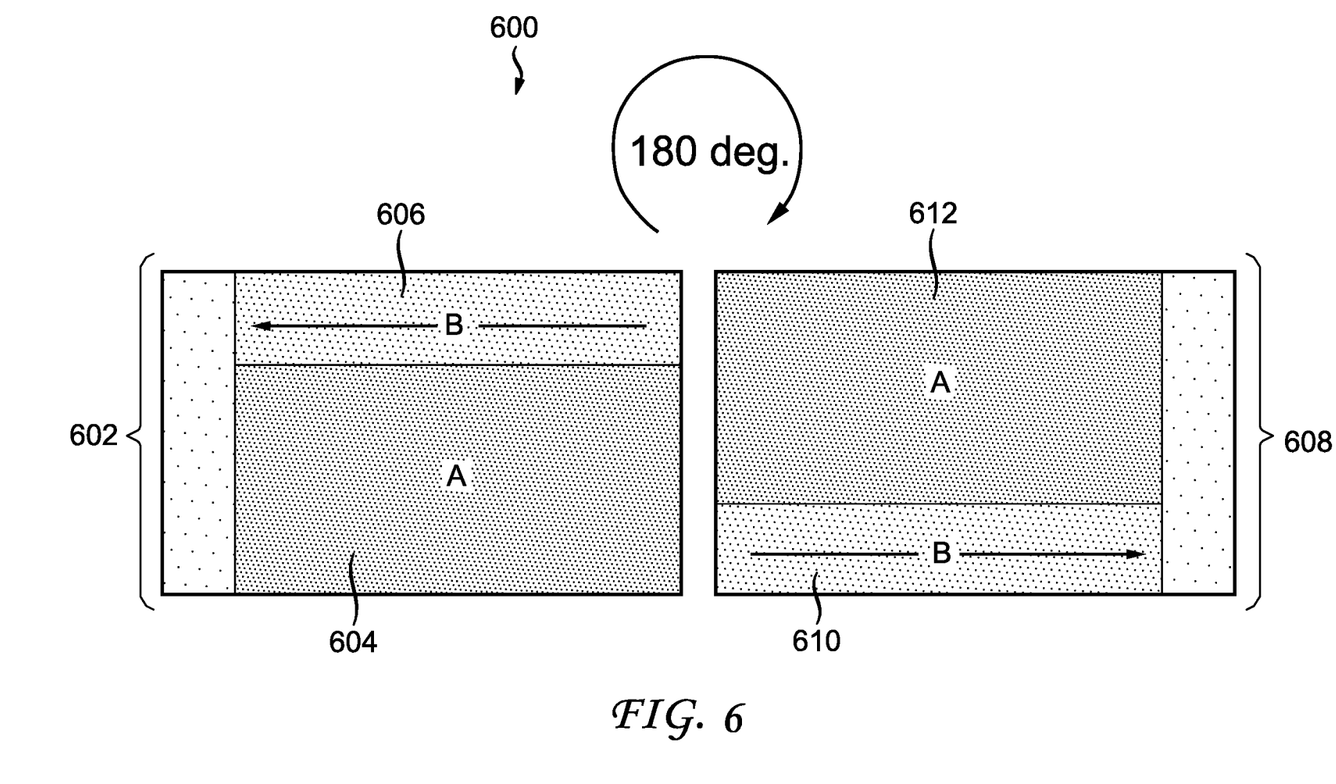
FIG. 6 shows yet another exemplary CTU scanning order in accordance with an embodiment of the present principles.

FIG. 6 depicts another example 600 of a CTU scanning technique in accordance with an embodiment of the present principles to encode/decode an image/frame 602. Step 2: Area B—as the area A 604 has been previously encoded/decoded, area B 606 can be encoded/decoded using spatial prediction coming from the area A 604. In order to minimize the impact on current encoder/decoder implementations, a technique of an embodiment of the present principles is to rotate the frame 602 by 180 degrees to yield a rotated frame 608. In this case, a rotated area B 610 can be seen as a last line of CTUs of the rotated frame 608 and encoded/decoded using prediction from above CTUs as depicted in FIGS. 4 and 5. Another method is to adapt the current encoder/decoder implementation to allow predicting from bottom blocks in addition to predicting from top/left blocks. One should notice that the first line of encoded CTUs inside a rotated area A 612 is also being used for predicting a line of CTUs of the rotated area B 610.

Figure 7:
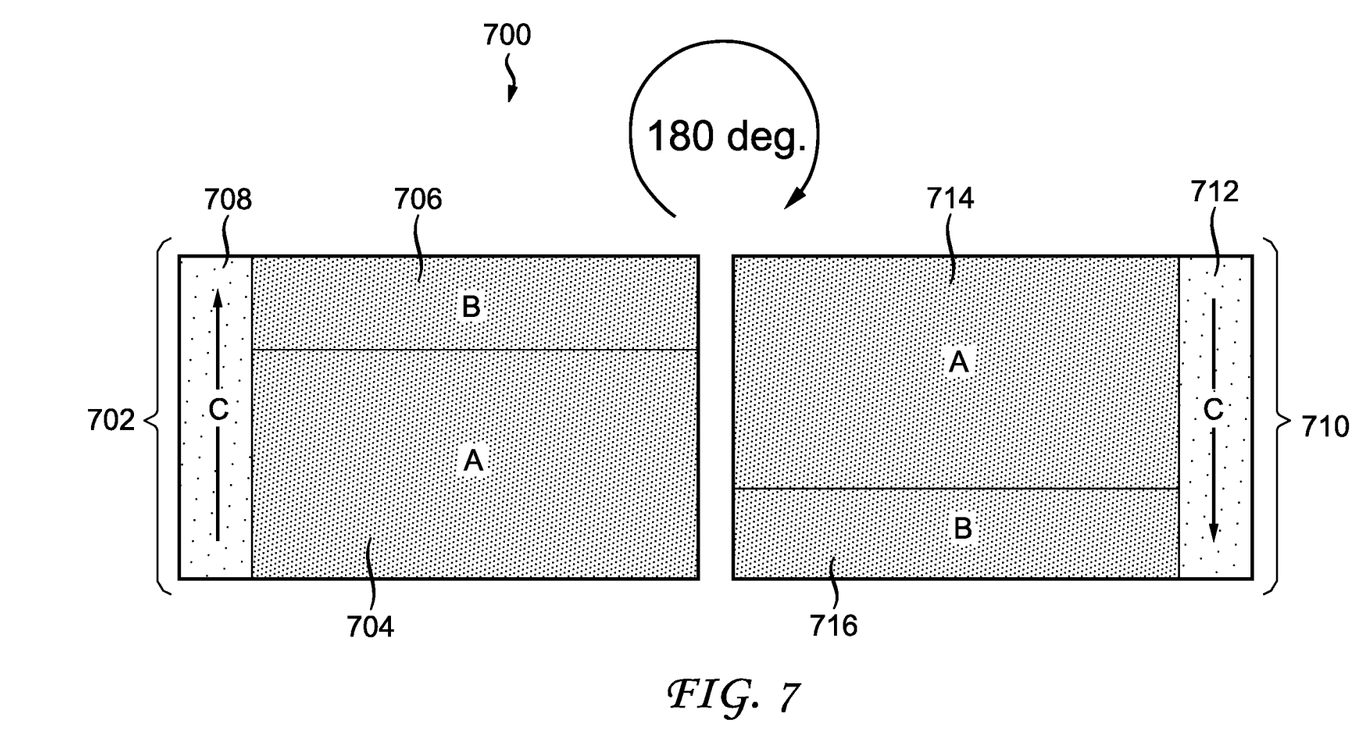
FIG. 7 shows still yet another exemplary CTU scanning order in accordance with an embodiment of the present principles.

FIG. 7 illustrates yet another example 700 of a CTU scanning technique in accordance with an embodiment of the present principles to encode/decode an image/frame 702. Step 3: Area C—since areas A 704 and B 706 have been previously encoded/decoded, an area C 708 can be encoded/decoded using spatial predictions based on the areas A 704 and B 706. A technique of an embodiment of the present principles is to again use a rotated frame 710. In this case, rotated area C 712 can be seen as a last column of CTUs of the rotated frame 710 and encoded/decoded using a prediction from a CTU on the left (i.e., from a rotated area A 714 and a rotated area B 716). Again, another method is to adapt the current encoder/decoder implementation to allow predicting from right blocks in addition to prediction from top/left blocks.

Inside a modern codec like HEVC, context variables are used for entropy based coding (for example, in context-adaptive binary arithmetic coding (CABAC)). In order to maximize context relevance in the case of embodiments employing techniques of the present principles such as Smart CTU Scan order, context saving can be performed as follows. At the end of the coding of the first line of CTUs inside an area A, the contexts of relevant CABAC encoders/decoders are saved. These contexts are then reloaded when starting to encode/decode an area B. Indeed, a first CTU in area B is actually just above a last CTU of a first line of area A. After the coding of the first CTU of the last line of area A, the contexts of relevant CABAC encoders/decoders are saved. These contexts are then reloaded when starting to encode/decode the area C.

Figure 8:
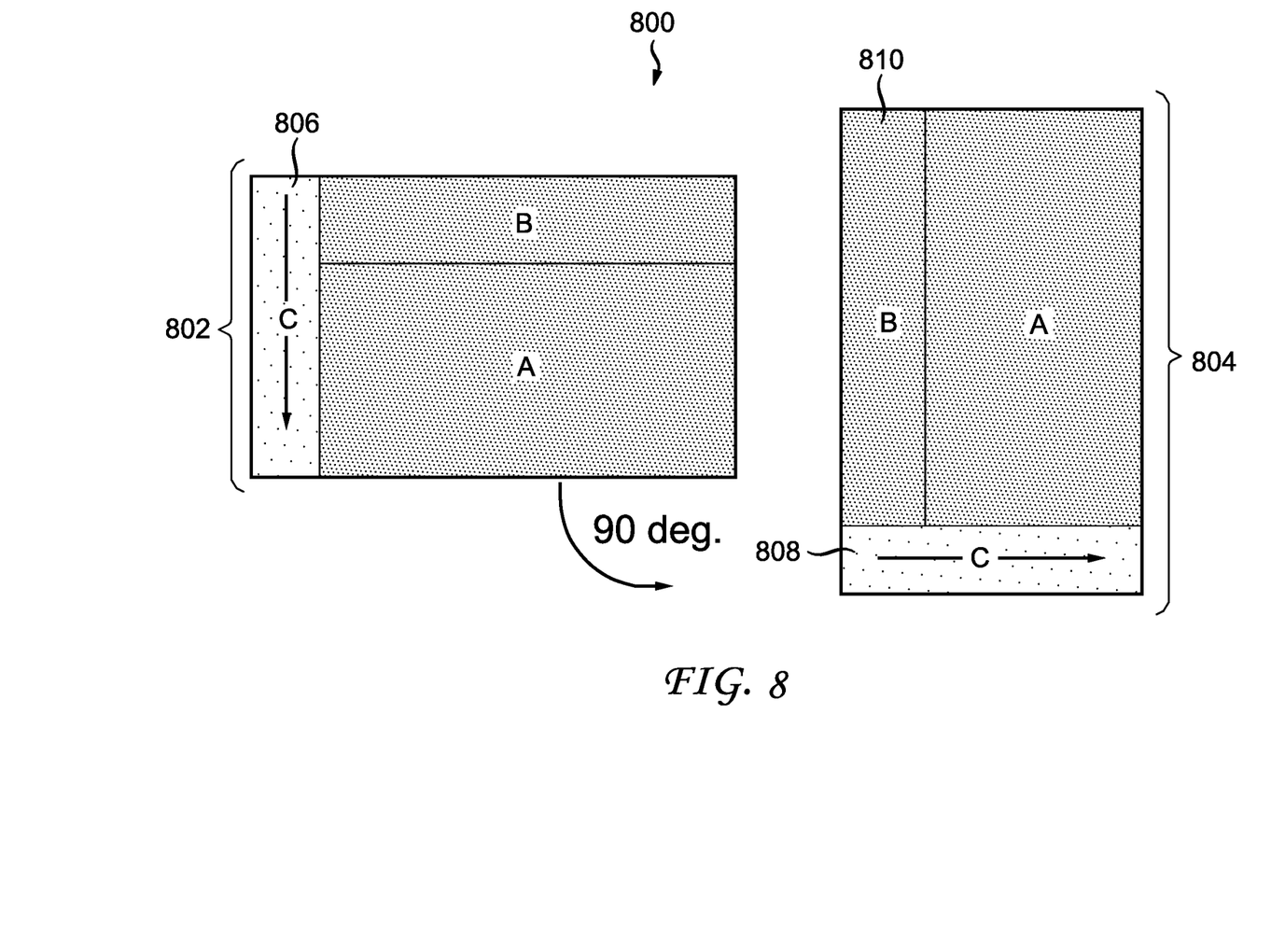
FIG. 8 depicts an exemplary variant technique for a coding order of in accordance with an embodiment of the present principles.

FIG. 8 depicts an example 800 of a variant technique for a coding order of an area C in accordance with an embodiment of the present principles. Instead of encoding/decoding area C 806 line by line, a frame 802 can be rotated again for 90 degrees, forming rotated frame 804. This enables the encoder/decoder to avoid saving context variables as described above since a first CTU in rotated area C 808 is a neighbor to a last one in rotated area B 810.

Figure 9:
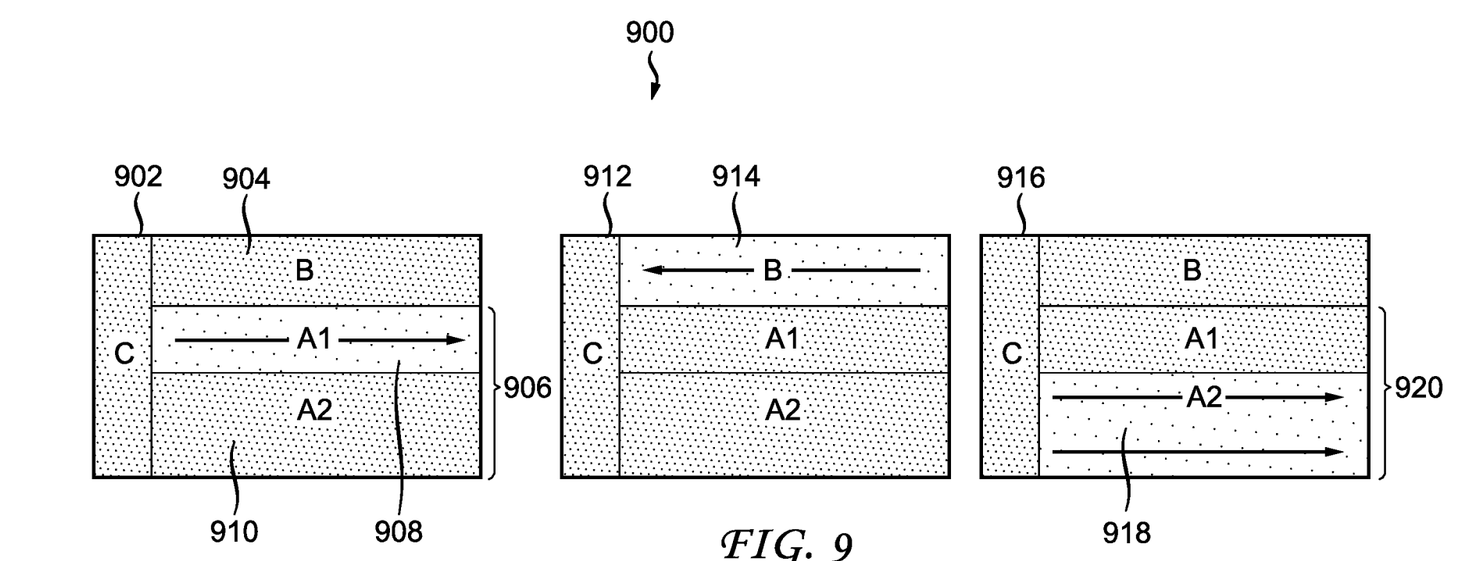
FIG. 9 depicts another exemplary variant technique for a coding order of in accordance with an embodiment of the present principles.

FIG. 9 shows an example 900 of a variant technique for a coding order of an area B in accordance with an embodiment of the present principles. Instead of coding an area B 904 after an area A 906, the area A 906 is split into a first line 908 and the rest 910. It allows one to avoid saving context variables for area B 904. This technique used together with the variant for area C shown in FIG. 8 eliminates any requirement for saving context variables. The first line 908 of area A 906 is scanned first as shown in frame 902. Area B 914 shown in frame 912 is then reverse scanned. Finally, the rest 918 of area A 920 is scanned as depicted in frame 916.

Figure 10:
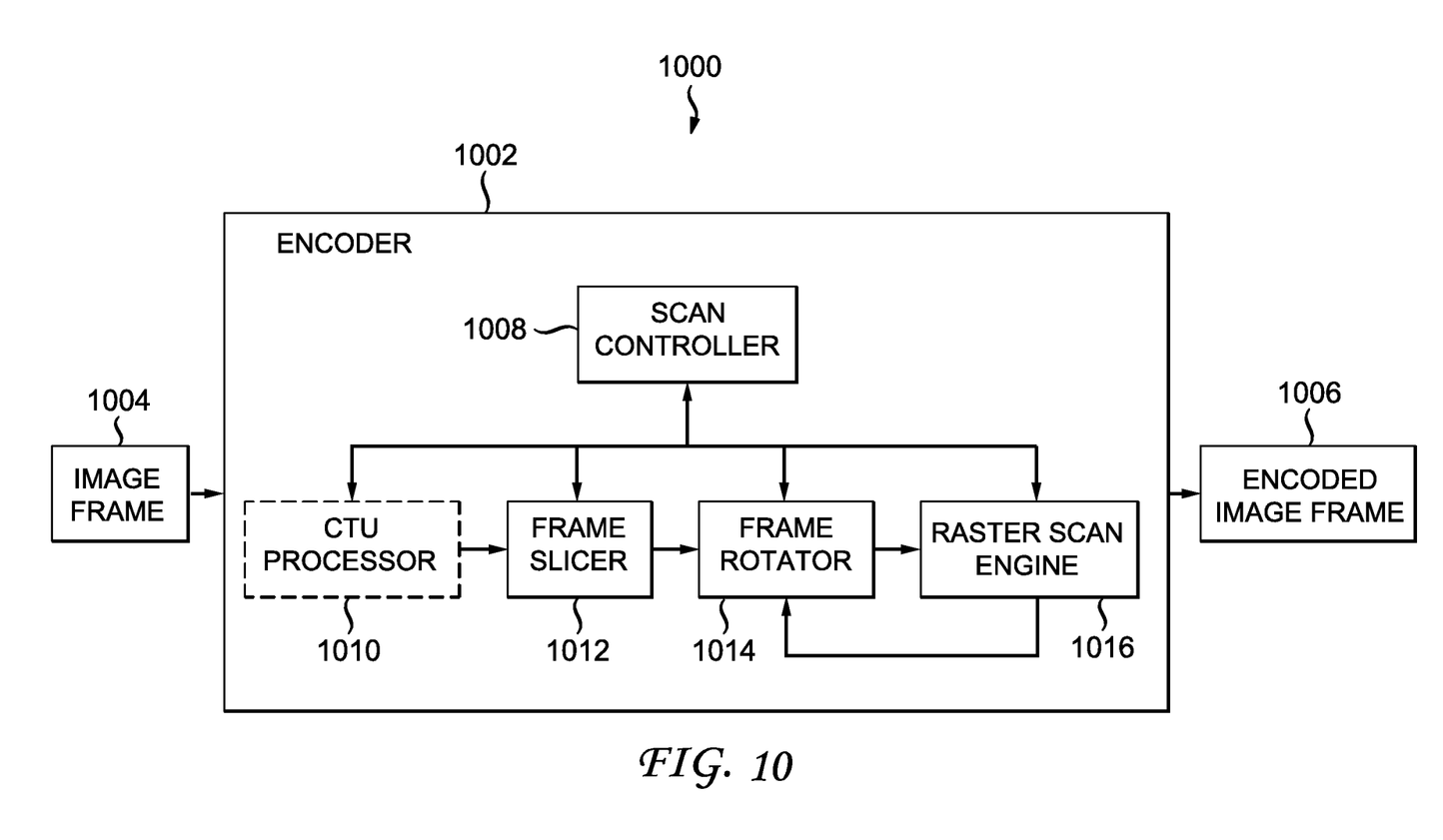
FIG. 10 illustrates an exemplary apparatus for encoding/decoding in accordance with an embodiment of the present principles.

Turning to FIG. 10, an exemplary apparatus 1000 for encoding/decoding in accordance with an embodiment of the present principles is illustrated. Examples may only refer to an encoder or a decoder to keep the description concise. However, one skilled in the art will appreciate that techniques employed in an encoder can also be used in a decoder and vice versa. The apparatus 1000 includes, in this example, an encoder 1002 that accepts an image frame 1004 and provides an encoded image frame 1006 (likewise a decoded image frame can be provided using a decoder that incorporates embodiments of the present principles). The encoder 1002 is comprised of a scan controller 1008 that oversees scanning processes for encoding the image frame

1004. The scan controller 1008 can also direct the embedding of (or the reading of for decoders) at least one bit that indicates a raster scanning order for a given region that is determined by a frame slicer 1012.

An optional CTU processor 1010 receives the image frame 1004 and divides the image frame 1004 into blocks or 'units' that are further processed to enable compression of the data required for transmitting the image frame 1004. The CTU processor 1010 can be optionally included in the apparatus 1000 or the image frame 1004 can be CTU processed before being received by the apparatus 1000. The frame slicer 1012 divides the image frame 1004 into regions made up of the processed CTU blocks/units. Each region has at least one bit associated with it that relays information regarding the raster scanning order for that region. During encoding, a bit or bits is embedded into each region. During decoding, the bit or bits is read from each region. Typically, three regions are constructed as described previously (area A, area B and area C), but the number of areas can increase or even decrease. The scan controller 1008 employs a frame rotator to rotate the image frame 1004 as required. Since different techniques can be used according to embodiments of the present principles, the scan controller 1008 can direct the frame rotator 1014 to rotate clockwise or counterclockwise for 90 or 180 degrees. Once the image frame 1004 is rotated, a raster scan engine 1016 scans a particular slice/region/area of the image frame 1004 as directed by the scan controller 1008. The scan controller 1008 can further rotate the image frame 904 and have the raster scan engine scan the image frame 1004 again. Thus, the image frame 1004 can be rotated and scanned any number of times.

Figure 11:
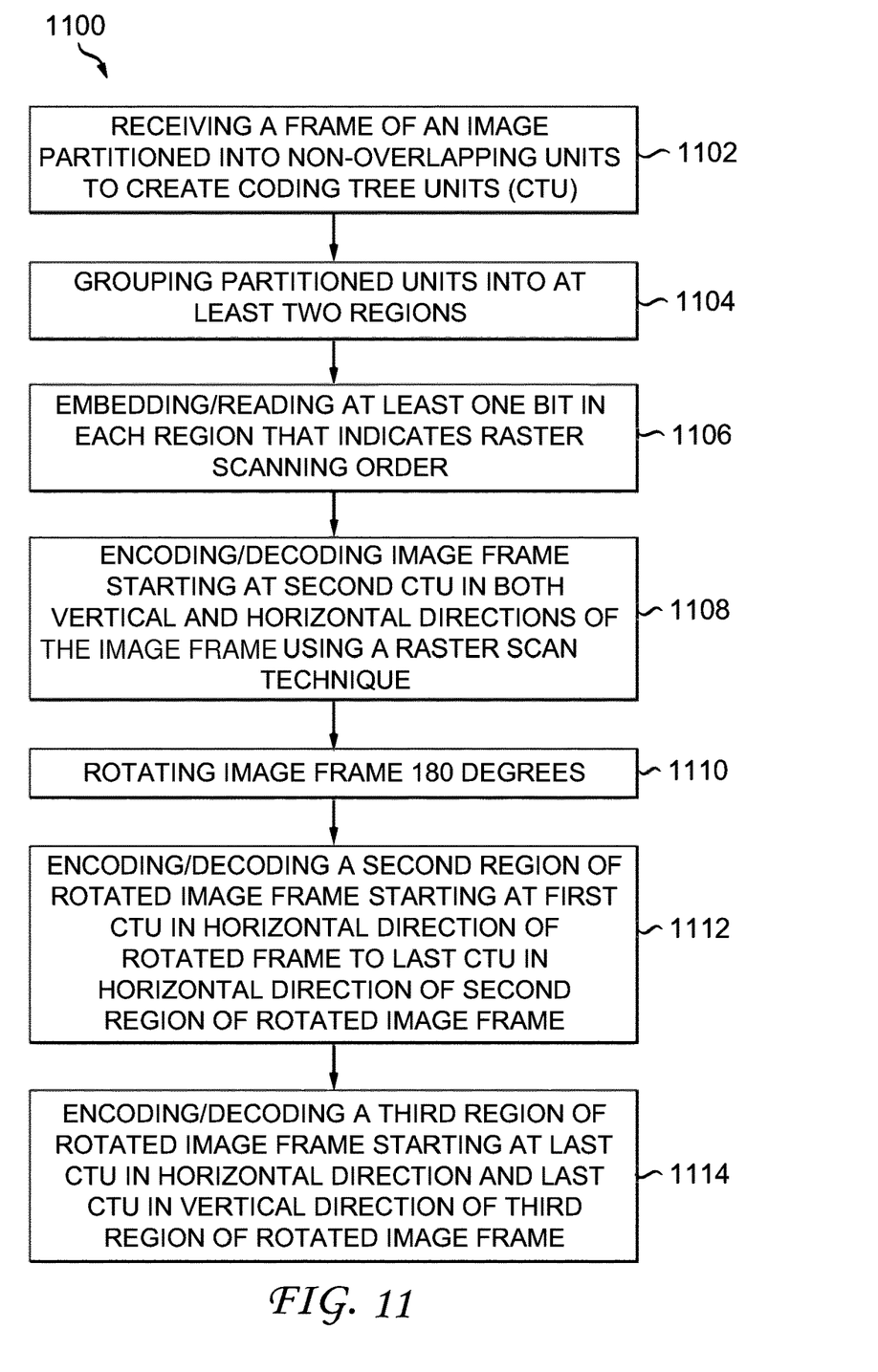
FIG. 11 shows a flow diagram of a method of image encoding/decoding according to an embodiment of the present principles.

In view of the techniques described above, methodologies that can be implemented in accordance with the embodiments will be better appreciated with reference to the flow chart of FIG. 11. While, for purposes of simplicity of explanation, the methodologies are shown and described as a series of blocks, it is to be understood and appreciated that the embodiments are not limited by the order of the blocks, as some blocks can, in accordance with an embodiment, occur in different orders and/or concurrently with other blocks from that shown and described herein. Moreover, not all illustrated blocks may be required to implement the methodologies in accordance with the embodiments.

FIG. 11 is a flow diagram of a method 1100 of encoding/decoding an image according to an embodiment of the present principles. The method 1100 starts by receiving a frame of an image that is partitioned into non-overlapping units to create coding tree units CTU 1102. The partitioned units are grouped into at least two regions 1104. For encoding, the regions can be determined to increase predictors for each coding unit. For decoding, the regions can be determined from the encoding process. At least one bit in each of the at least two regions indicates a raster scanning order 1106. For the decoding process, the bit(s) are read from each of the regions. For the encoding process, the bit(s) are embedded into each of the regions. The bit or bits indicate a raster scanning order for a given region.

An image frame is encoded/decoded, based on the scanning order bit of a first region, starting at a second coding tree unit (CTU) in both vertical and horizontal directions of the image frame using a raster scan technique 1108. The image frame is then rotated 180 degrees 1110. The rotation can be accomplished in either clockwise or counterclockwise direction. A second region of the rotated image frame is encoded/decoded, based on the scanning order bit of the second region, starting at a first CTU in a horizontal direction of the second region of the rotated frame to a last CTU in a horizontal direction of the second region of the rotated image frame 1112. A third region of the rotated image frame is then encoded/decoded, based on the scanning order bit of the third region, starting at a last CTU in a horizontal direction and a first CTU in a vertical direction of the third region of the rotated image frame to a last CTU in a horizontal direction and a last CTU in a vertical direction of the third region of the rotated image frame 1114.

The method 1100 can be enhanced by further rotating the rotated image frame an additional 90 degrees clockwise making the vertical area or slice of the rotated image into a horizontal area or slice of a further rotated image frame. The horizontal area or slice of the further rotated image frame can then be encoded/decoded starting at a first CTU in a horizontal direction and a last CTU in a vertical direction to a last CTU in the horizontal direction and a last CTU in the vertical direction. Further processing as described previously can also be done such that it becomes unnecessary to save context variables.

What has been described above includes examples of the embodiments. It is, of course, not possible to describe every conceivable combination of components or methodologies for purposes of describing the embodiments, but one of ordinary skill in the art can recognize that many further combinations and permutations of the embodiments are possible. Accordingly, the subject matter is intended to embrace all such alterations, modifications and variations. Furthermore, to the extent that the term "includes" is used in either the detailed description or the claims, such term is intended to be inclusive in a manner similar to the term "comprising" as "comprising" is interpreted when employed as a transitional word.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, an optical disc (such as, for example, a CD also known as a compact disc and/or a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. An apparatus for encoding an image frame,
wherein the image frame being partitioned into non-overlapping units, the partitioned units being included in a first region, a second region and a third region of the image frame, each of the first region, the second region and the third region being associated with an indicator indicating a raster scanning order;
comprising:
at least one processor configured for
encoding the third region of the image frame, based on the indicator of the third region, starting at a first unit from the left and the top in the third region using a raster scan technique;
encoding the second region of the image frame, based on the indicator of the second region, starting at a first unit from the right in the second region; and
encoding the first region, based on the indicator of the first region, starting at a first unit from the top or the bottom in the first region.

2. The apparatus of claim 1, wherein:
the processor being further configured for rotating the image frame 180 degrees before encoding the third region.

3. The apparatus of claim 2, wherein:
the processor being further configured for rotating the rotated image frame an additional 90 degrees clockwise making the first region of the rotated image into a horizontal direction before encoding the first region.

4. The apparatus of claim 1, wherein:
the processor being further configured for
dividing the third region into at least two smaller regions before scanning the bottom right region, the first smaller region being one unit in height and the length of the bottom right region;
encoding the bottom right region of the image frame, based on the scanning order bit of the bottom right region, starting at a first unit of the first smaller region to a last unit in a left to right horizontal direction;
encoding, based on the scanning order bit of the top right region, starting at a last unit to a first unit in a left to right horizontal direction of the top right region; and
encoding the image frame, based on the scanning order bit of the third region, starting at a first unit of the second smaller region to a last unit in a left to right horizontal direction for each remaining row of the second smaller region.

5. A method for encoding an image,
wherein the image frame being partitioned into non-overlapping units, the partitioned units being included in a first region, a second region and a third region of the image frame, each of the first region, the second region and the third region being associated with an indicator indicating a raster scanning order;
comprising:
encoding the third region of the image frame, based on the indicator of the third region, starting at a first unit from the left and the top in the third region using a raster scan technique;
encoding the second region of the image frame, based on the indicator of the second region, starting at a first unit from the right in the second region; and
encoding the first region, based on the indicator of the first region, starting at a first unit from the top or the bottom in the first region.

6. The method of claim 5, further comprising: rotating the image frame 180 degrees before encoding the third region.

7. The method of claim 5, further comprising:
rotating the rotated image frame an additional 90 degrees clockwise making the first region of the rotated image into a horizontal direction before encoding the first region.

8. The method of claim 5, further comprising:
dividing the third region into at least two smaller regions before scanning the third region, the first smaller region being one unit in height and the length of the third region;
encoding the bottom right region of the image frame, based on the scanning order bit of the third region, starting at a first unit of the first smaller region to a last unit in a left to right horizontal direction;
encoding, based on the scanning order bit of the second region, starting at a last unit to a first unit in a left to right horizontal direction of the second region; and encoding the image frame, based on the scanning order bit of the third region, starting at a first unit of the second smaller region to a last unit in a left to right horizontal direction for each remaining row of the second smaller region.

9. A non-transitory computer readable program product, comprising program code instructions for performing the method according to claim 5 when the program code instructions are executed by a computer.

10. A non-transitory computer readable storage medium carrying a software program comprising program code instructions for performing the method according to claim 5, when the software program is executed by a computer.

11. An apparatus for decoding an image,
wherein the image frame being partitioned into non-overlapping units, the partitioned units being included in a first region, a second region and a third region of the image frame, each of the first region, the second region and the third region being associated with an indicator indicating a raster scanning order;
comprising:
at least one processor configured for
decoding the third region of the image frame, based on the indicator of the third region, starting at a first unit from the left and the top in the third region using a raster scan technique;
decoding the second region of the image frame, based on the indicator of the second region, starting at a first unit from the right in the second region; and
decoding the first region, based on the indicator of the first region, starting at a first unit from the top or the bottom in the first region.

12. The apparatus of claim 11, wherein the at least one processor being further configured for rotating the image frame 180 degrees before decoding the third region.

13. The apparatus of claim 11, wherein the at least one processor being further configured for rotating the rotated image frame an additional 90 degrees clockwise making the first region of the rotated image into a horizontal direction before decoding the first region.

14. The apparatus of claim 11, wherein the processor being further configured for:
dividing the third region into at least two smaller regions before scanning the third region, the first smaller region being one unit in height and the length of the third region;
decoding the bottom right region of the image frame, based on the scanning order bit of the third region, starting at a first unit of the first smaller region to a last unit in a left to right horizontal direction;
decoding, based on the scanning order bit of the second region, starting at a last unit to a first unit in a left to right horizontal direction of the second region; and
decoding the image frame, based on the scanning order bit of the third region, starting at a first unit of the second smaller region to a last unit in a left to right horizontal direction for each remaining row of the second smaller region.

15. A method for decoding an image,
wherein the image frame being partitioned into non-overlapping units, the partitioned units being included in a first region, a second region and a third region of the image frame, each of the first region, the second region and the third region being associated with an indicator indicating a raster scanning order;
comprising:
decoding the third region of the image frame, based on the indicator of the third region, starting at a first unit from the left and the top in the third region using a raster scan technique;
decoding the second region of the image frame, based on the indicator of the second region, starting at a first unit from the right in the second region; and
decoding the first region, based on the indicator of the first region, starting at a first unit from the top or the bottom in the first region.

16. The method of claim 15, further comprising: rotating the image frame 180 degrees before decoding the third region.

17. The method of claim 15, further comprising:
rotating the rotated image frame an additional 90 degrees clockwise making the first region of the rotated image into a horizontal direction before decoding the first region.

18. The method of claim 15, further comprising:
dividing the third region into at least two smaller regions before scanning the third region, the first smaller region being one unit in height and the length of the third region;
decoding the bottom right region of the image frame, based on the scanning order bit of the third region, starting at a first unit of the first smaller region to a last unit in a left to right horizontal direction;
decoding, based on the scanning order bit of the second region, starting at a last unit to a first unit in a left to right horizontal direction of the second region; and
decoding the image frame, based on the scanning order bit of the third region, starting at a first unit of the second smaller region to a last unit in a left to right horizontal direction for each remaining row of the second smaller region.

19. A non-transitory computer readable program product, comprising program code instructions for performing the method according to claim 15 when the program code instructions are executed by a computer.

20. A non-transitory computer readable storage medium carrying a software program comprising program code instructions for performing the method according to claim 15, when the software program is executed by a computer.

* * * * *

UNITED STATES PATENT AND TRADEMARK OFFICE
CERTIFICATE OF CORRECTION

| | | |
|---|---|---|
| PATENT NO. | : 10,659,785 B2 | Page 1 of 1 |
| APPLICATION NO. | : 16/064484 | |
| DATED | : May 19, 2020 | |
| INVENTOR(S) | : Franck Galpin, Fabien Racape and Tangi Poirier | |

It is certified that error appears in the above-identified patent and that said Letters Patent is hereby corrected as shown below:

On the Title Page

Item (57) In the Abstract, Column no. 2, Line 14, delete "016);" and insert --1016);--

Signed and Sealed this
Twenty-second Day of November, 2022

Katherine Kelly Vidal
*Director of the United States Patent and Trademark Office*